May 22, 1951 H. W. SACHS 2,553,835
SPOOL DRIVE MOUNTING MEANS
Filed April 28, 1949 2 Sheets-Sheet 1
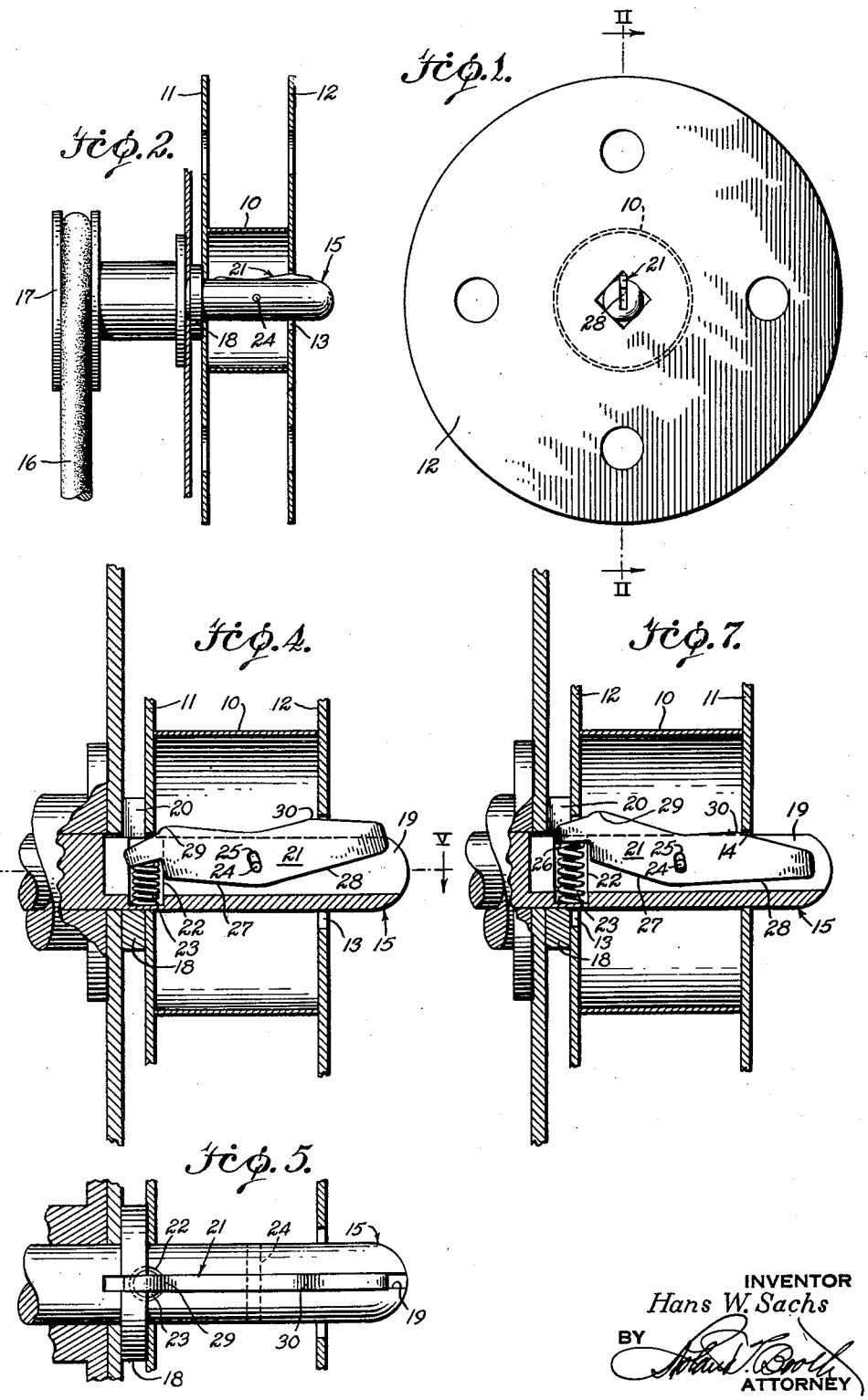
INVENTOR
Hans W. Sachs
BY
ATTORNEY May 22, 1951    H. W. SACHS    2,553,835
SPOOL DRIVE MOUNTING MEANS
Filed April 28, 1949    2 Sheets-Sheet 2
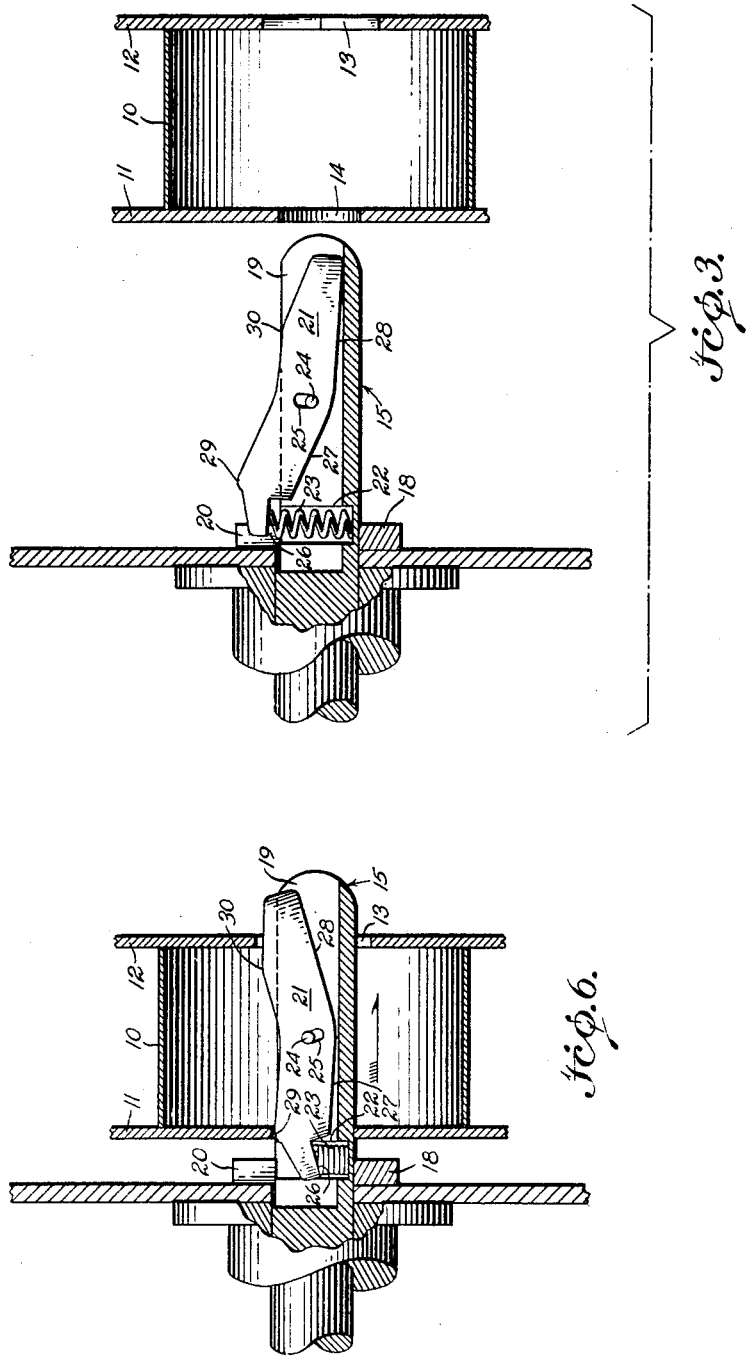
INVENTOR
Hans W. Sachs
BY
ATTORNEY Patented May 22, 1951

2,553,835

UNITED STATES PATENT OFFICE 2,553,835

SPOOL DRIVE MOUNTING MEANS

Hans W. Sachs, Binghamton, N. Y., assignor to Remington Rand Inc., New York, N. Y., a corporation of Delaware Application April 28, 1949, Serial No. 90,138

8 Claims. (Cl. 242—70)

The present invention relates to the mounting of spools for winding, for example, photographic film, wire, or the like.

Generally, such spools have a hollow core about which the inner convolution of the film or the like is wound, and the ends of the core are closed by end walls, each of which is provided with an aperture coaxial with the core so that the core can be engaged upon a drive spindle of the apparatus on which it is to be employed. To lock the spool to the spindle for rotation therewith, as is necessary, for example, when the spool is to be driven for rotation or frictionally controlled by a brake device associated with its mounting spindle, it is usual to form at least one of said openings of non-circular form for drive transmitting engagement with a complemental formation on the drive spindle, which elsewhere may be mainly circular in cross-section. In that event, one of said apertures is usually square, or other appropriate non-circular form, and provides a drive transmitting aperture whereas the other aperture is round and merely supports the other end of the spool on the spindle without any drive transmitting function. In some cases, a non-circular drive aperture is provided in each end wall of the core which virtually confines the user to the employment of the particular make of spool which the drive spindle of the particular apparatus is designed to receive. Likewise, in some cases where a spindle is specially designed to accommodate a spool with a non-circular aperture at one end and a circular opening at the other end, the specific designed set-up must be followed, and if the spindle has a square drive boss at its inner end, as is usual in such cases, the square aperture must always be directed inwardly too, and circumstances do arise where it is desired to apply a spool the other way round.

The present invention provides means whereby a spool of the class described may be securely locked on the drive spindle of the apparatus with which it is to be used irrespective of whether the core is provided with two non-circular apertures, or one non-circular aperture and one circular aperture, thus, also enabling the latter type of spool to be drivably connected to the spindle with the non-circular drive aperture at either the inner or the outer end of the spindle.

The invention will now be described by way of example with reference to the accompanying diagrammatic drawings in which the same reference numerals have been employed to designate corresponding parts in the various figures.

Fig. 1 is an end elevation of a standard 16 mm. movie or microfilm spool drivably connected to its mounting spindle and locked thereto for rotation therewith, the spool being of a type having a circular opening at one end of its hub and a square opening at the other, the square aperture in this case, being at the outer end.

Fig. 2 is a section on the line II—II of Fig. 1.

Fig. 3 is an enlarged fragmentary cross-section through the spool drive spindle with the spool spaced therefrom ready to be engaged on the spindle.

Fig. 4 corresponds to Fig. 3 but shows the spool fully engaged on the spindle.

Fig. 5 is a section on the line V—V of Fig. 4.

Fig. 6 corresponds to Fig. 4 but shows the parts in the relationship they assume as the spool is being removed from the spindle.

Fig. 7 corresponds to Fig. 4 but shows the spool engaged on the spindle with the square drive aperture at the inner end.

In the drawings, 10 represents the hollow core of the film spool, the end walls 11 and 12 of which extend outwardly to provide flanges which prevent any tendency to telescoping of the film winding on the core. The wall 12 is formed with a central square aperture 13 and the wall 11 has a round aperture 14. As is usual, the round aperture is designed as a free sliding fit on the spindle, the sides of the square aperture corresponding to such diameter. The reference numeral 15 indicates the film drive and mounting spindle which is mounted in bearings at its inner end and is driven for rotation in any convenient manner, for example, by the belt 16 engaging the pulley 17 (see Fig. 2). The boss 18 provides an abutment against which the inner end of the hub engages when the spool is fully engaged on the spindle. The spindle and the boss are slotted as indicated respectively by the reference numerals 19 and 20 for the reception of a drive key 21, and towards the inner end of the spindle slot 19, a drilling 22 is provided to accommodate the small compression spring 23. The drive key 21 is rockably located in the slot 19 on the pin 24 which extends through an elongated aperture 25 of the drive key.

The invention will now best be understood by reference to Fig. 3, in which the spool is shown aligned with the spindle ready to be engaged thereon. It will, however, be noted that the drive key 21 is deliberately profiled having a flat formation 26 on the under surface at the inner end for engagement with the top of the spring 23. The under surface is angled as indicated at 27 and 28 to provide adequate clearance for the required rocking action. In assembly the spring 23 is first inserted in its drilling and the drive key 21 is then inserted in the slot whereafter the pin 24 is engaged through the spindle and the elongated aperture 25. It will be noted that the tail portion forming the outer end of the drive key is so proportioned that it cooperates with the base of the spindle slot to limit upward movement of the inner end of the drive key and thus also to prevent displacement of the spring 23. The upper surface of the drive key is profiled to provide two cam portions 29 and 30 with surfaces sloping progressively downward on each side of them. The two cam portions 29 and 30 are so spaced that, as seen in Figs. 4 and 7, they engage the inner marginal edges of the walls 11. Thus, to engage the spool on the spindle from the position in which it is seen in Fig. 3, it suffices merely to push the spool axially inward on the spindle 15, and, as the inclination leading up to the cam portion 29 is engaged by the cooperating part of the periphery of the round aperture 14, the inner end of the drive key is depressed until the aperture 14 has passed over the high point of the cam portion 29 whereafter the spring 23 raises the inner end of the drive key so that the cam portion 29 engages the inner edge of the wall 11 at the aperture 14 to hold the spool firmly against the boss 18 as seen in Fig. 4. In that position the outer end of the drive key is projected upwardly to engage the cooperating corner of the square aperture 13 as seen in Fig. 4, and the spool is securely locked to the spindle for rotation therewith.

To remove the spool it suffices to force it outwardly in the direction of the arrow seen in Fig. 6 until the round hole 14 has passed over the cam portion 29, whereafter the drive key is restored, under the influence of the spring 23, to the Fig. 3 position, as outward movement of the spool is continued.

The procedure for applying the spool to the spindle with the square aperture 14 at the inner end of the spindle is exactly the same as that hitherto described. It will be noted however that, as seen in Fig. 7, it is the inner end of the drive key 21 which is then projected upwardly.

It is important to note that the drive key should operate with a rocking action, as distinct from a pivoting action, about the pin 24, for it is of the utmost importance that whichever end of the drive key is projected out of the profile of the spindle 15, according to whether a square aperture is to be at an inner or outer station of the spindle, the drive key should be securely engaged in a corner of the square aperture 14, otherwise, the drive is liable to be snatchy. The elongation of the aperture 25 is therefore important because it gives a degree of float to the drive key which permits such engagement. Likewise, to provide a snatch free drive it is important that the drive key should be of such width that it fits the spindle slot 19, at the same time however, the fit must not be such as to interfere with the rocking action of the drive key about the pin 24.

The invention claimed is:

1. For mounting a spool of the class described having end flanges of its hub formed with axially aligned apertures, one in each flange, of which apertures one is of non-circular form for drive engagement with a complemental formation of a mounting spindle, the provision of spool mounting means ensuring locking of the spool to the spindle for drive engagement therewith irrespective of whether the non-circular aperture is disposed at the outer or at the inner end of the spindle; said spool mounting means comprising a spool mounting spindle, a radial slot extending axially of said spindle, a pin engaged through said spindle to extend transversely through said slot, a drive key in said slot rockably mounted on said pin and having portions extending on each side of such pin to such extent that the overall length of said lever is at least as great as the width of a spool to be accommodated on said spindle, one of which portions projects from said slot when the other is depressed to lie substantially within the circular contour of said spindle, and spring means operative to project one end portion of said lever outwardly of said slot.

2. Spool mounting means as set forth in claim 1 wherein the outer surface of said drive key is profiled to define a cam surface on each of said end portions of said drive key, each of said cam portions having a high portion spaced sufficiently from the ends of said key to engage inside the end flanges of the standard width spool hub which the spindle is designed to accommodate.

3. Spool mounting means as set forth in claim 2 wherein the cam profile on said drive key progressively increases in effective height inwardly from each end of said drive key toward the high portions and then progressively decreases to a point approximately midway between said high portions.

4. For mounting a spool of the class described, a spool mounting spindle having an inner end and an outer end, bearing means rotatably mounting said spindle at its inner end, a drive connection on said spindle at its inner end, a radial slot in said spindle extending longitudinally thereof, and a drive transmitting key rockably engaged in said slot; said drive key being of length greater than the width of a standard width spool to be accommodated and having a spool aperture engaging formation near each end so proportioned that one of said formations is projected radially out of said slot for driving engagement with one of said apertures when the other formation is contained within said slot.

5. For mounting a spool of the class described, a spool mounting spindle having an inner end and an outer end, bearing means rotatably mounting said spindle at its inner end, a drive connection on said spindle at its inner end, a radial slot in said spindle extending longitudinally thereof, a drive key rockably engaged in said slot; said drive key being of length greater than the width of a standard width spool to be accommodated on the spindle and having spool aperture engaging formations near each end so proportioned that one of said formations is projected radially out of said slot for driving engagement with one of said apertures when the other formation is contained within said slot, and spring means operative to project one of said formations radially outwardly of said slot.

6. Means as set forth in claim 5 wherein a boss is provided on said spindle adjacent said bearing means on the side thereof remote from said drive connection for abutment with the inner end of the spool in its fully engaged position on the spindle and wherein said spool aperture engaging formations comprise cam surfaces one near each end of said drive key, the cam profiles progressively increasing in effective height inwardly from each end of said drive key toward the high portions of said cam surfaces and then progressively decreasing to a point approximately midway between said high portions.

7. For mounting a spool of the class described, a spool mounting bearing means rotatably mounting said spindle at its inner end, a drive connection on said spindle at its inner end, a radial slot in said spindle extending longitudinally thereof, spool driving means comprising a drive key, a slotted aperture therein, pin means arranged to reside in said aperture for rockably securing said key in said slot, plural cam dwells disposed adjacent each end of said key, spring means for radially urging one of said cam dwells externally of the periphery of said spindle and a second of said plural cam dwells arranged to radially extend externally of the periphery of said spindle upon the compression of said spring means.

8. For mounting a spool of the class described having a hub and end flanges secured thereto, said flanges provided with coaxial apertures of differing diameters, a spindle, a peripheral slot extending longitudinally therein, a key, pin and slot means for rockably securing said key in said spindle slot, plural cam dwells disposed adjacent each end of said key, spring means for urging one of said cam dwells externally of the periphery of said spindle, spool locking means associated therewith, the other of said cam dwells arranged to radially extend externally of the periphery of said spindle upon the compression of said spring means, and said cam dwells arranged to engage the respective peripheries of said diametrically differing flange apertures.

HANS W. SACHS.

REFERENCES CITED

The following references are of record in the file of this patent:

UNITED STATES PATENTS

| Number | Name | Date |
|---|---|---|
| 1,041,184 | Spiro | Oct. 15, 1912 |
| 1,179,924 | Howell | Apr. 18, 1916 |
| 1,713,277 | Goldberg | May 14, 1929 |
| 1,871,230 | Foster | Aug. 9, 1932 |
| 2,392,966 | Baia | Jan. 15, 1946 |